United States Patent
Nayak et al.

(10) Patent No.: US 6,921,427 B2
(45) Date of Patent: Jul. 26, 2005

(54) PROCESS FOR COLD BRIQUETTING AND PELLETIZATION OF FERROUS OR NON-FERROUS ORES OR MINERAL FINES BY IRON BEARING HYDRAULIC MINERAL BINDER

(75) Inventors: Bansidhar Nayak, Orissa (IN); Vibhuki N. Mishra, Orissa (IN)

(73) Assignee: Council of Scientific & Industrial Research, New Delhi (IN)

( * ) Notice: Subject to any disclaimer, the term of this patent is extended or adjusted under 35 U.S.C. 154(b) by 90 days.

(21) Appl. No.: 10/310,133

(22) Filed: Dec. 5, 2002

(65) Prior Publication Data
US 2004/0107800 A1 Jun. 10, 2004

(51) Int. Cl.$^7$ ............................................... C22B 1/243
(52) U.S. Cl. .............................. 75/770; 75/771; 75/773
(58) Field of Search ........................... 75/770, 771, 773

(56) References Cited

U.S. PATENT DOCUMENTS 4,168,966 A * 9/1979 Furui et al. .................... 75/322
5,100,464 A * 3/1992 Kelly et al. .................... 75/321

* cited by examiner

Primary Examiner—Melvyn Andrews
(74) Attorney, Agent, or Firm—Nath & Associates PLLC; Harold L. Novick

(57) ABSTRACT

The present invention provides a process for cold briquetting and pelletization of ferrous or non-ferrous or mineral fines using iron bearing hydraulic mineral binders for metallurgical applications, said process consisting the steps of: mixing 80–95% by Wt. of a metallurgical/mineral/carbonaceous/oil contaminated dust/fines/sludge with 3–10% by Wt. of an iron bearing hydraulic mineral binder and optionally with 2–6% by Wt. water and 0.05 to 0.20% by Wt. of a surface active agent to form a homogenized dry mix/slurry, pelletizing/compacting the dry mix/slurry to form an agglomerated mass, and curing the agglomerated mass for 3–20 days by exposing the agglomerated mass to atmospheric air for 10–14 hours followed by moisture treatment.

20 Claims, 12 Drawing Sheets

PROCESS FOR COLD BRIQUETTING AND PELLETIZATION OF FERROUS OR NON-FERROUS ORES OR MINERAL FINES BY IRON BEARING HYDRAULIC MINERAL BINDER

FIELD OF THE INVENTION

The present invention relates to a process for cold briquetting and pelletisation of ferrous or non-ferrous ores or mineral fines by iron bearing hydraulic mineral binder for metallurgical application.

BACKGROUND AND PRIOR ART TO THE INVENTION

Agglomerated products such as briquettes, pellets and blocks made from fine derivatives of oxides and metals of iron, limestone, dolomite, dunite, solid carbon etc. by iron bearing hydraulic mineral binder will find suitable application as a feed material in blast furnace for extraction of iron, in rotary and shaft kiln for reduction and oxidising roasting and sintering, in tunnel, chamber and moving grate type of furnaces for calcinations, roasting and sintering.

Agglomeration methods of briquetting and pelletisation are quite well-known for converting fines and powdery derivatives of ores, minerals, residue and solid wastes into lumpy sizes for various industrial use. This is a common practice in iron and steel industries for use of Fe-containing fine materials in the metallurgical furnaces. Many process developments have been made for production of briquettes and pellets from various metallurgical fines by hot and cold methods. Depending on the nature of fines, oil contamination, mineral association and Fe-structural phases, both hot and cold processes have been developed to make briquettes and pellets.

Japanese patent no 8135, 731 dated 08 Apr. 1981 (Cl. C22 B1/14), by Jpn. Kokai Tokkyo Koho (Sumitomo Metal Ind. Ltd.) describes production of cold iron ore briquettes using cement (OPC) by hardening at 90° C. for 24 hours and drying at 90° C. temperature for 1 hour to get crushing strength in the order of 256 kg.

De Souza Neto et al., Brazilian patent Pedido PI 7705, 932 dated 03 Apr. 1979 (Cl. C22 B1/242), describes briquetting of Fe-ore fines using binders like hydrated lime, molasses, bentonite, Na-silicate, cement (OPC/pozz.), $Na_2SO_4$, tar. dextrin or maniac flour.

Nippon Kokan K. K.et al.'s, Japanese Patent No. JP 60 33 319 (85 33 319) dated 20 Feb. 1985 (Cl. C22 B1/14), describes use of 5 to 15% basic slag as binder in making briquettes of ferrous and non-ferrous ores by heat treatment at 5 to 200° C. temperature, and steam curing.

Nippon Kokan K. K. and Kokai Tokkyo Koho's Japanese Patent No. 80, 100, 940 dated Aug. 1, 1980 (Cl. C22 B1/14) describes use of cement (OPC) as binder in briquetting iron ore by curing for 3 days at room temperature and then steam curing at 100° C. and then drying at 100 to 500° C. for development of strength.

Austin Lawrence J. and et al., German Patent No. 2,614, 452 dated 13 Oct. 1977 (C1 C22 B1/244), describes briquetting of sponge Fe-dust with bituminous binder such as aq. emulsion of mineral oil.

Knill Kenneth G. et al., German Patent No. 2,605,215 dated 26 Aug. 1976 (C1. B22 F1/00), describes briquetting of steel shavings, turnings and scrap dust using fibrous material, high alumina cement, limestone as binder.

"Present state of sponge iron briquettes in consideration of the selection of the binder agent" by Maschinenfabrik, Koeppern GmbH and Co., K-G, Hattinger Fed. Rep. Ger., MPT Metall. Plant Technol., 1981, 5(2) illustrates the use of waterglass, molasses, spent sulphate lye, pitch and bitumen as binder for hot and cold briquetting of sponge iron fines.

Kudryavtsev, O. M. et al. (USSR) Intensif. Protesessov. Domennoi Plavki Osvoenie Pechei Bol'shogo Ob'ema, 1979 (5) 28–30 illustrates hot briquetting for metallised fines at 700 and 800° C. temperature.

Kiwaki Yoshihiro et al. (Onoda Cement Co. Ltd., Nippon Steel Corp.), Jpn. Kokai Tokkyo Koho, JP 60, 184, 642 (85, 184, 642) (Cl. C22 B1/243), 20 Sep. 1985 patent describes use of cement (OPC) as a binder for briquetting of Fe-ore fines.

Similarly, the processes in production of Fe-pellets, Lotosh V. E. et al., USSR Patent No. 730, 844 (Cl. C22 B1/243), 06 May 1980 describes use of cement (OPC), earth metals and chloride salts as a mechanical activator for production of cold bonded iron ore pellets.

Salykin A. A. et al., USSR Patent No. 648, 626 (Cl. C22 B1/243), 25 Feb. 1979 describes use of binding agents like polymethacrylamide, soda, bentonite in cold pelletisation of iron ore materials.

Sasaba Minoru, Tetsu to Hogan, 1985, 71 (15), 1780-6 Japan illustrates use of specially developed binder from LD slag and alumina sludge mixtures by melting for making cold bonded Fe-ore pellets.

Furui Takeo et al. (Nippon Steel Corp.) Japan Kokai 7711103 (Cl. C22B1/14), 27 Jan. 1977 patent discloses the use of cement clinker and limestone mixture as binder which is mixed with iron ore material by grinding for production of non-sintered pellets.

Munrio Neil et al. (British steel Corp.) Ger Offen. 2, 622, 348 (Cl. C22 B1/14), 02 Dec. 1976 patent discloses use of bentonite and water as binder for making Fe-ore pellet by sintering on grate to obtain desired strength and properties for BF application.

Earlier inventions disclose the use of various types of organic and inorganic materials such as lime, molasses, cellulose, dextrin, resin, bentonite, plastic clay, limestone, dolomite, cements, slag, mineral oil, tar, phenol, earth metal silicate, chloride and sulphates as binders in briquetting and pelletisation of iron-containing ores and fines by hot and cold methods which involves curing at normal atmospheric condition, under steam pressure, under heat at 200 to 800° C. temperature for hardening to make suitable for B.F. use. Some of the processes also describes sintering of cold bonded briquettes and pellets at 1200° C. temperature for blast furnace use. Some of the process further describes use of oil contaminated iron-sludge by heating for de-oiling and hot briquetting.

The drawbacks of the earlier processes are the use of wide varieties of binding materials, steam curing, heat hardening, sintering and hot compaction under pressure in making briquettes and pellets which are energy intensive. Most of the organic and inorganic binders dissociate at low temperature (below 600° C.) and easily soluble in water for which the briquettes and pellets made out of these binders give unsatisfactory performance in respect to durability, resistance to moisture, volume stability and thermal stability. In addition, the use of sulphate, alkali, chloride, phosphate bearing binding materials results in poor sinterability and reducibility of briquettes and pellets. These types of binders also add deleterious impurities in the metallurgical process and create emission of hazardous and corrosive gases which cause destruction of furnace life and air pollution. Thus there exists a need to provide a process that overcomes the aforesaid limitations.

OBJECTIONS OF THE PRESENT INVENTION

The main objective of the present invention is to provide a process for cold briquetting and pelletisation of ferrous or non-ferrous ores or mineral fines by iron bearing hydraulic mineral binder for metallurgical application which obviates the drawbacks as detailed above.

Another object of the present invention is to provide a briquetting and pelletisation process that eliminates energy intensive processes such as heat hardening, steam curing, thermal treatment, hot pressing.

Still another object of the present invention is to provide a briquetting and pelletisation process that replaces the use of costly and multiple varieties of binding materials constituting undesirable constituents deleterious for metallurgical operations.

Yet another object of the present invention is to provide a briquetting and pelletisation process that produces briquettes and pellets having improved chemical, physical, thermal and volume stability properties and that gives better metallurgical performance.

One more object of the present invention is to provide a briquetting and pelletisation process that uses a wide variety of raw materials to make briquette, pellet, microgranule and block suitable for application in metallurgical and high temperature furnaces.

One another object of the present invention is to provide a briquetting and pelletisation process that uses of all kinds of minerals including Fe-oxide and carbon bearing materials as such or in composite mixtures to make briquette, pellet, microgranule and block suitable for application in metallurgical and high temperature furnaces.

Another object of the present invention is to make the briquetting and pelletisation process energy efficient, pollution free and cost effective.

SUMMARY OF THE INVENTION

Accordingly, the present invention provides a process for cold briquetting and pelletization of ferrous or non-ferrous or mineral fines using iron bearing hydraulic mineral binders for metallurgical applications, said process consisting the steps of: mixing 80–95% by Wt. of a metallurgical/mineral/carbonaceous/oil contaminated dust/fines/sludge with 3–10% by Wt. of an iron bearing hydraulic mineral binder and optionally with 2–6% by Wt. water and 0.05 to 0.20% by Wt. of a surface active agent to form a homogenized dry mix/slurry, pelletizing/compacting the dry mix/slurry to form an agglomerated mass, and curing the agglomerated mass for 3–20 days by exposing the agglomerated mass to atmospheric air for 10–14 hours followed by moisture treatment.

DETAILED DESCRIPTION OF THE PRESENT INVENTION

A process for cold briquetting and pelletization of ferrous or non-ferrous ores or mineral fines using iron bearing hydraulic mineral binders for metallurgical applications, said process comprising the steps of:

(a) mixing 84–95% by Wt. of a metallurgical/mineral/carbonaceous/oil contaminated material in the form of dust/fines/sludge with 4–10% by Wt. of an iron bearing hydraulic mineral binder and optionally with 2–6% by Wt. water and 0.05 to 0.20% by Wt. of a surface active agent to form a homogenized dry mix/slurry;

(b) pelletizing/compacting the dry mix/slurry of step (a) to form an agglomerated mass, and, (c) curing the agglomerated mass of step (b) for 3–20 days by exposing the agglomerated mass to atmospheric air for 10–14 hours followed by moisture treatment.

In an embodiment of the present invention, metallurgical/mineral/carbonaceous/oil contaminated dust/fines/sludge is selected from the group consisting of Iron containing ores, blast furnace dust and sludge, basic oxygen furnace (BOF) dust and sludge, mill scale and oil and carbon contaminated sludge and fines, lime, limestone, dolomite, dunite, quartzite, coke, carbonaceous materials and mixtures thereof.

In another embodiment of the present invention, the iron bearing hydraulic mineral binder contains 20 to 25% by Wt. $Fe_2O_3$, 40–60% by Wt. CaO and MgO and 12–18% by Wt. $SiO_2+Al_2O_3$.

In still another embodiment of the present invention, the surface active agent is Triethanolamine.

In yet another embodiment of the present invention, the agglomerated mass is in the form of cylindrical blocks/briquettes/pellets/microgranules.

In one more embodiment of the present invention, the granulometric size of the mixture is to about 10 mm for block/briquette.

In one another embodiment of the present invention, the granulometric size of the mixture is to about 2 mm for pellets/microgranules.

In a further embodiment of the present invention, the iron bearing hydraulic mineral binder is a dry powder material of fineness of particles passing at least 90% by 170 mesh BSS sieve and having minimum surface area 300 $M^2$/kg (Blaine).

In an embodiment of the present invention, water is added during the step of mixing in step (a) if the agglomerated mass is to be prepared in the form of blocks or briquettes.

In another embodiment of the present invention, wherein in step (b), the slurry is fed to a rolling or compaction type press device to form the blocks or briquettes.

In still another embodiment of the present invention, the rolling/compacting type press device applies compaction load in the range of 0.5 to 5 tonne.

In yet another embodiment of the present invention, wherein in step (b), the dry mixture is fed to a drum or disc granulator if the agglomerated mass is to be in the form pellets or microgranules.

In one more embodiment of the present invention, water and surface active agent are added to the dry mix in the drum or disc granulator to form the pellets/microgranules.

In one another embodiment of the present invention, the dry mix should contain at least 6% by Wt. of iron bearing hydraulic mineral binder for preparing pellets/microgranules.

In a further embodiment of the present invention, the slurry should contain at least 3% by Wt. of iron bearing hydraulic mineral binder for preparing blocks/briquettes.

In an embodiment of the present invention, the size of the pellets is in the range of 8–16 mm.

In another embodiment of the present invention, the size of the micro-granules is in the range of 2–8 mm.

In still another embodiment of the present invention, granulation is time is in from about 8 minutes to about 12 minutes to the pellets and micro granules.

In yet another embodiment of the present invention, the agglomerated mass is cured by exposing the agglomerated mass for 3–20 days to atmospheric air for 12 hours followed by moisture treatment.

In one more embodiment of the present invention, the cold strength of the blocks/briquettes thus produced attain from about 10 MPa to about 40 MPa in about 20 days.

In a further embodiment of the present invention, the cold strength of the pellets/microspheres thus produced attain from about 4 MPa to about 18 MPa in about 20 days.

BRIEF DESCRIPTION OF THE ACCOMPANYING DRAWINGS

In the drawings accompanying the specification,

FIGS. 1(a) to (d) represent the effect of compaction load and percentage of iron bearing mineral binder on cold crushing strength of cylindrical shaped briquettes.

Figure 1:
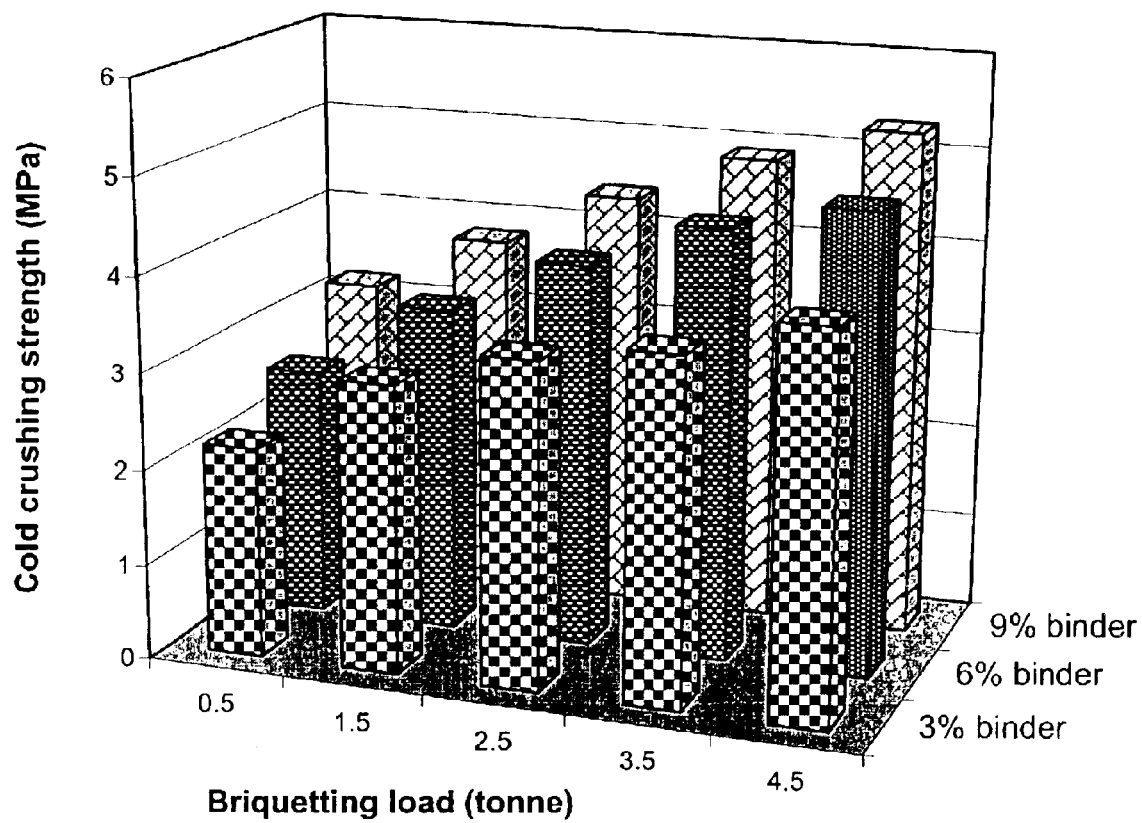
Figure 1B:
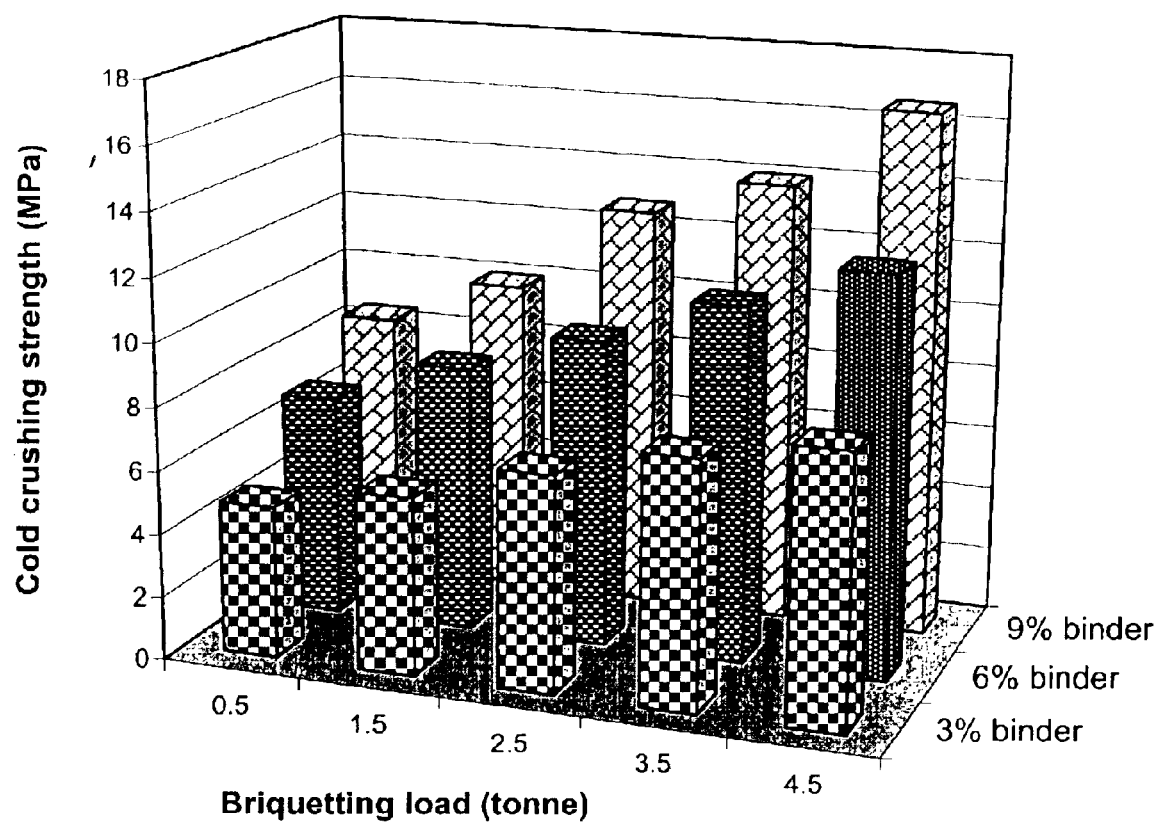
Figure 1C:
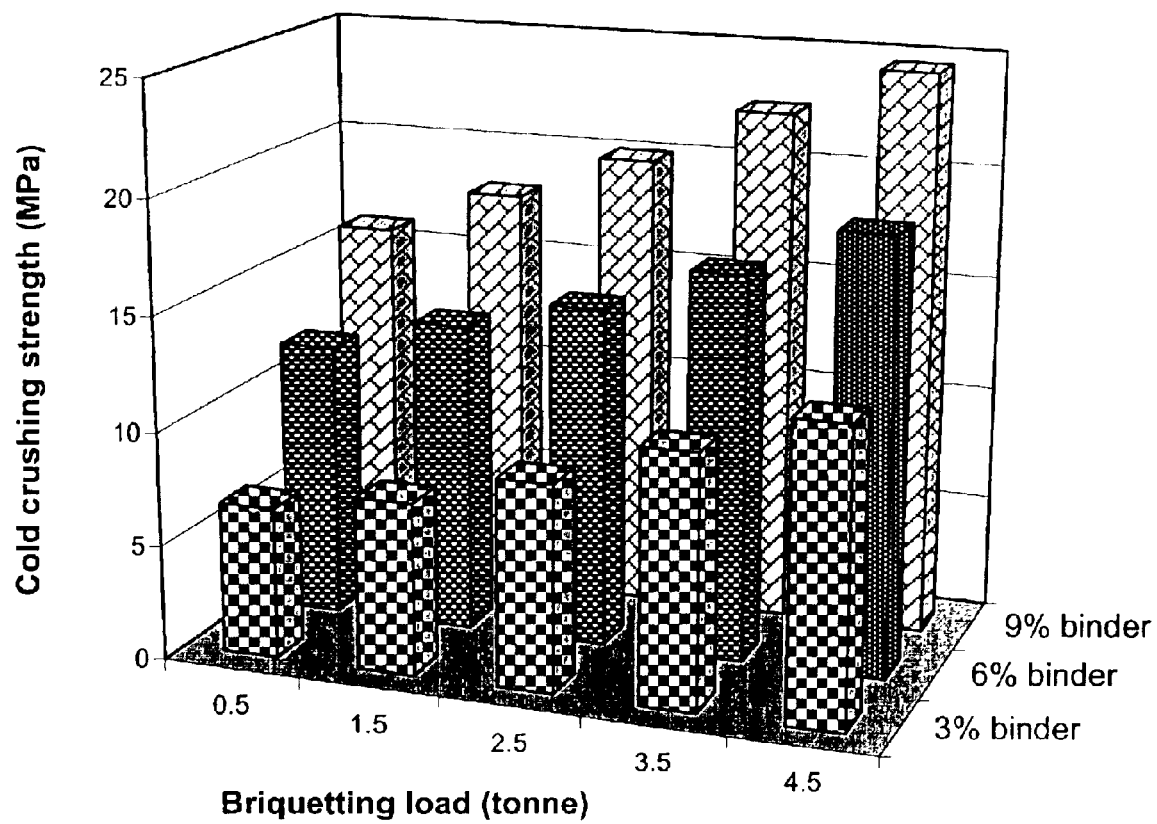
Figure 1D:
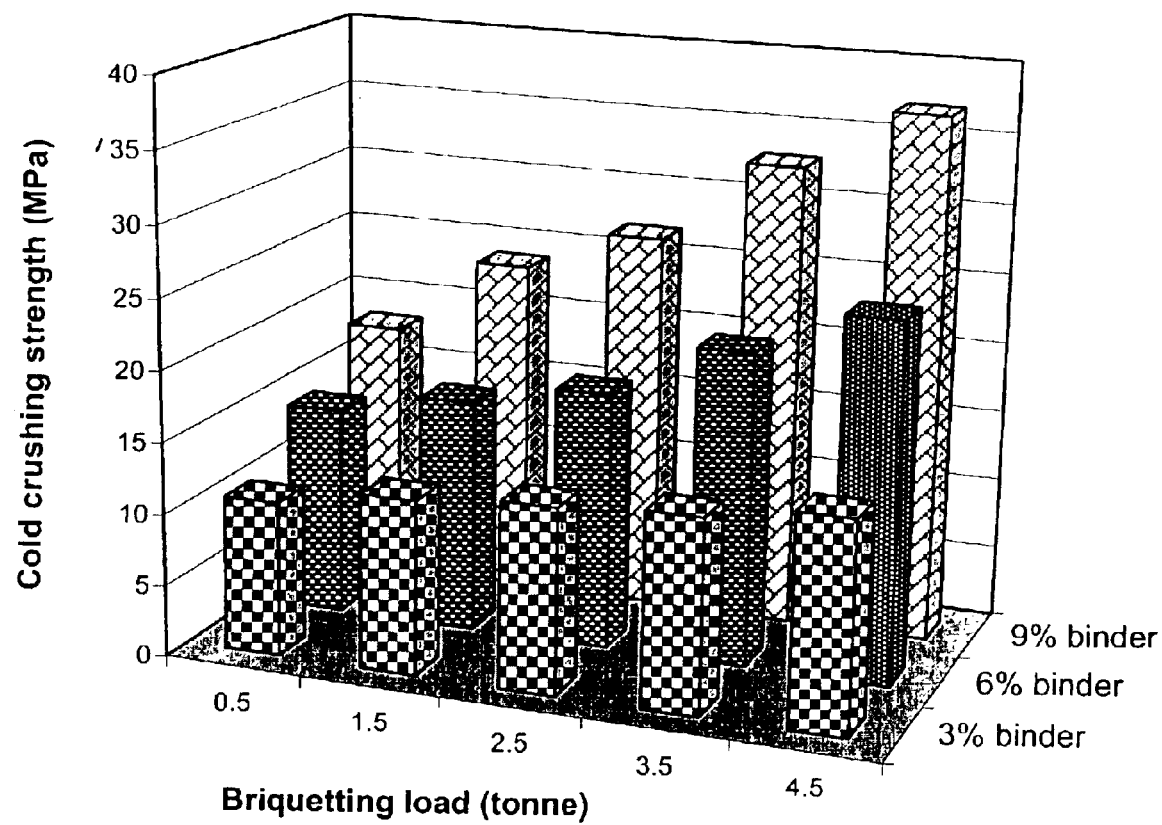

The process of the present invention is described in detail below and in the examples which are given by way of illustration and should not be construed to limit the scope of the invention in any manner.

Iron bearing hydraulic mineral binder, surface active agent and water are the ingredients mixed with different kinds of metallurgical and mineral fines in formulation of mixtures for manufacture of blocks, briquettes, pellets and micro-granules. The iron bearing hydraulic mineral binder is a powdery material of fineness of particles passing at least 90% by 170 mesh BSS sieve and having minimum surface area 300 $M^2$/kg (Blaine) like Portland cement. The binder hydrates in presence of water and develops binding strength. The surface active agent is in form of liquid which acts for easy dispersion of binder and improves the binding effect on oily and carbonaceous particles. Depending on the type of iron bearing phases, content of other mineral matter, solid carbon, content of oil and moisture, the ingredients are mixed to make homogenised mixtures in dry or semi wet state. According to the use of the mixture for briquetting and pelletisation, the addition of water is made. Normally briquetting mixtures are made in wet form where water is added during the mixing. In case of granulation for pellet making, dry mixture is used with addition of water during the pelletisation. In specific cases, the surface active agent is also used along with water. Triethanolamine is the surface active agent and it is used along with water (5 ml/L of water as minimum dose) depending on the binder content for easy dispersion and improvement in binding property of the binder on oily surface particles. Based on the mixture composition and content of iron bearing mineral binder, the addition of water is made accordingly to maintain the ratio between 0.2 to 1.8 of W/B (Water:Binder) for uniform hydration of the binder in making briquette, pellet or microgranules. The fines ranging in size up to 10 mm and up to 2 mm are the granulometric fractions in making block or briquette and pellet or micro-granulation mixtures respectively. In case of briquetting, the mixture of fed to the rolling or compaction type or press devices or machines to make briquettes and blocks. Based on the composition and type of fine derivatives and particle size of the mixed material, the compaction load or pressure 0.5 to 5 tonne is applied for manufacture of briquetted or block shape products. The binder content in the mixture for briquette and block making is 3 to 10% on weight basis. Higher percentage of binder is also usable depending the application of final product.

Dry or semi wet mixture consisting of particle size up to 2 mm is fed to the drum or disc granulator devices for manufacture of ball like pellet or microgranulated particles by adding required quantity of water. Balling time of the mixture is 5 to 10 minutes for manufacture of 8 to 20 mm diameter pellet and microgranules of less than 8 mm sizes. Manufacture of these agglomerated products of briquettes, blocks and pellets from wet mixture is preferably within 5 hours from the time of contact of water with the binder to avoid the effect of false setting and drying.

Figure 2:
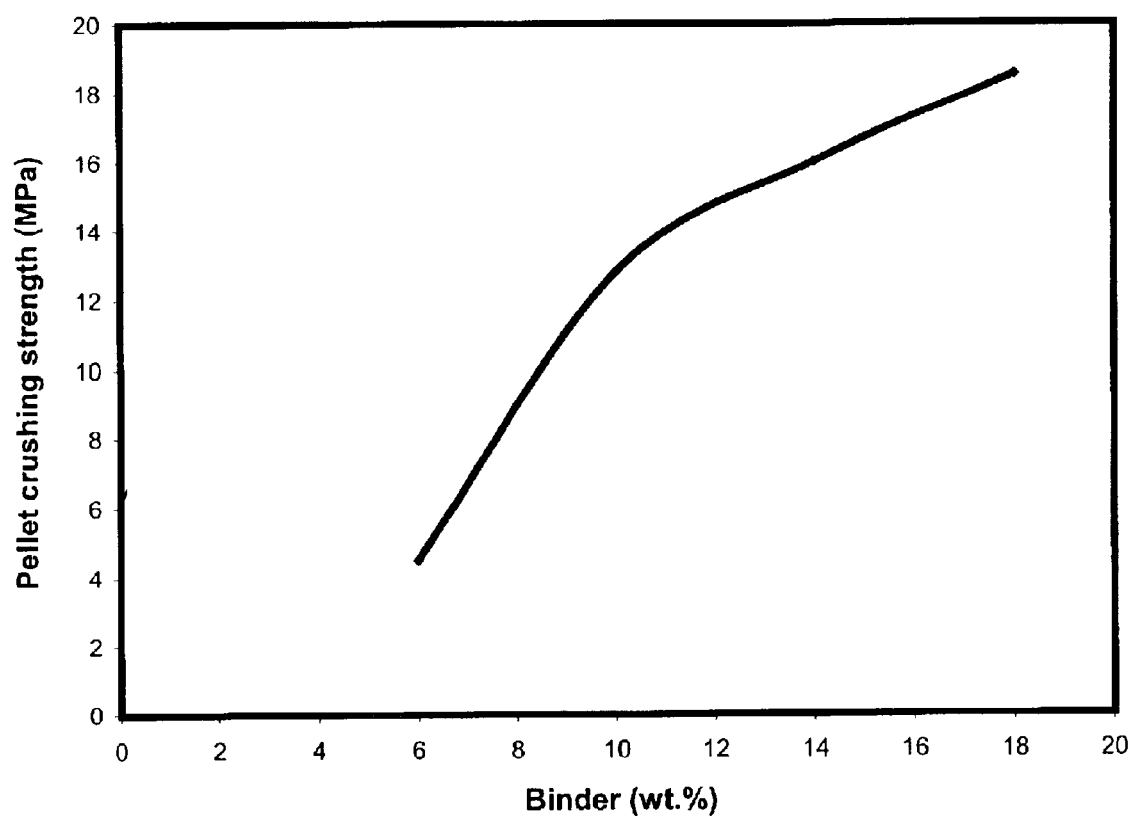
FIG. 2 represents the crushing strength of iron oxide pellets in presence of iron bearing mineral binder on $20^{th}$ day of curing in water.

The green briquettes, blocks and palletised products are kept exposed in atmosphere for 12 hours and then at every 12 hours interval, moisture is sprayed for curing and to develop cold strength. The briquette, block and pellet gradually attain strength with time and water curing. Hydration strength of the binder is a gradual process with time and on $20^{th}$ day the product attains almost 95% of strength. But in 3 to 7 days of time about 50 to 70% of the total strength attains in the product. Depending on the type of iron bearing metallurgical derivatives, mineral fines, particle size, binder content of 3 to 10% and compaction load of 0.5 to 5 tonne, the cold strength of the briquetted and block shaped products attain 10 to 40 MPa on $20^{th}$ day. Green strength of briquetted and block shape products in presence of the binder immediately after casting retains 20–30 kg/$cm^2$ as compressive strength to sustain 3 to 4 drops from 1 M height on a steel plate which bears sufficient green strength for easy transportation through conveyor belt or any other means of transportation for further curing. FIGS. 1(a), (b), (c) and (d) illustrates the effect of compaction load and percentage of iron bearing mineral binder on cold crushing strength of cylindrical shaped briquettes consisting of iron oxide particles (−6.3 mm size) after 1, 3, 7 and 20 days of curing in water. In case of pellet made by balling in disc or drum granulators, the crushing strength on $20^{th}$ day of curing in water attains 4 to 18 MPa in the presence of 6 to 18% of binder. FIG. 2 illustrates the crushing strength of iron oxide pellets (8 to 12 mm in diameter) in presence of iron bearing mineral binder on $20^{th}$ day of curing in water. Depending upon the chemistry of the feed material for metallurgical application, higher strength in the briquette and palletised product is achievable using higher percentage of binder.

Iron bearing hydraulic mineral binder plays a significant role to develop the cold strength by hydration in the agglomerated product. Chemical constituents of the binder vary from 25 to 45% of $Fe_2O_3$, 40 to 60% of CaO+MgO and 12 to 18% of $SiO_2+Al_2O_3$. Mineralogically these oxides of the binder exists in different solid-solution structures of CaO—

Figure 3:
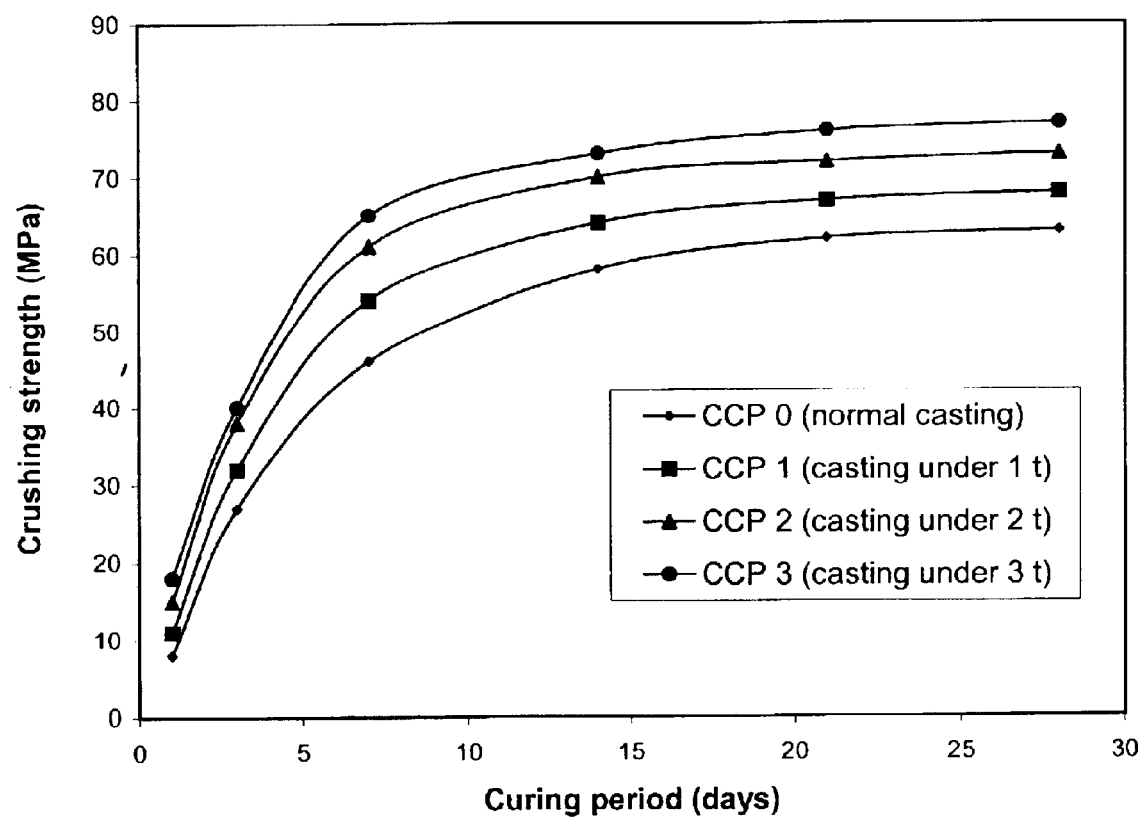
FIG. 3 represents the performance of the iron bearing hydraulic mineral binder on strength at normal casting and casting under various compaction pressures.
Figure 4:
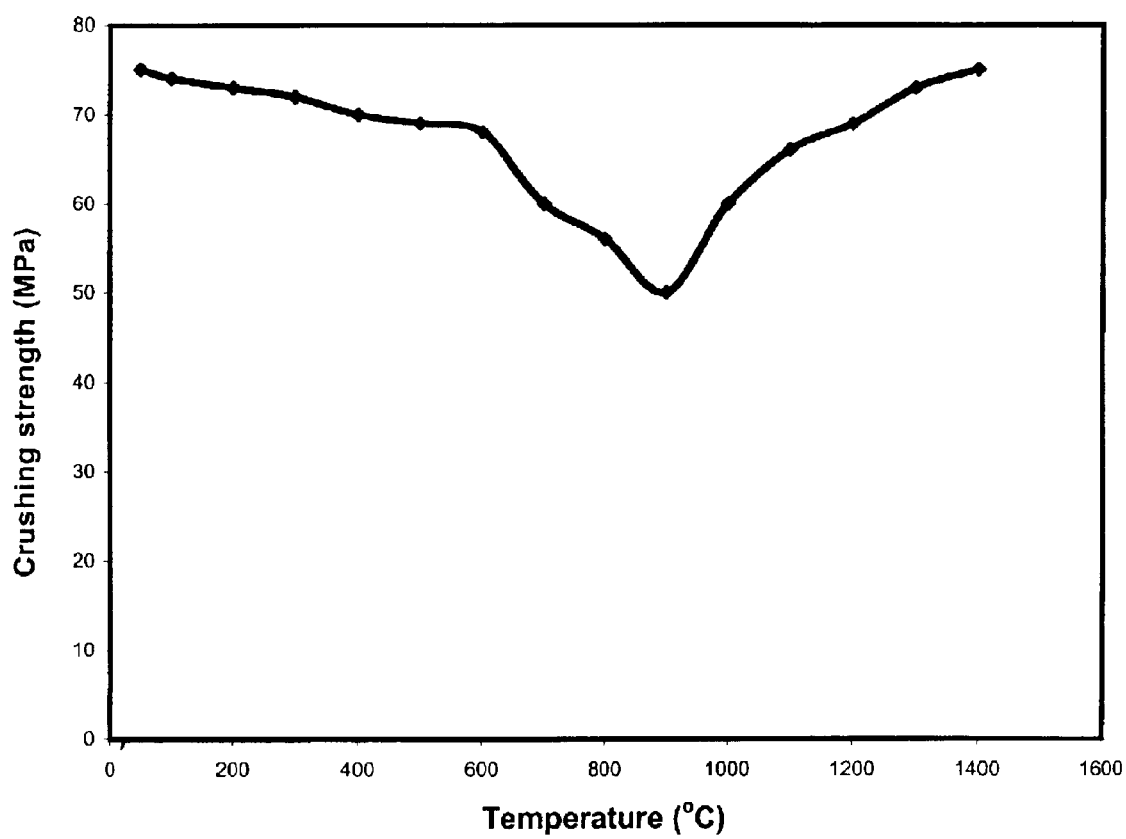
FIG. 4 represents the typical phenomena in loss and gain of strength in the casted cubes of iron bearing hydraulic mineral binder at elevated temperatures.
Figure 5:
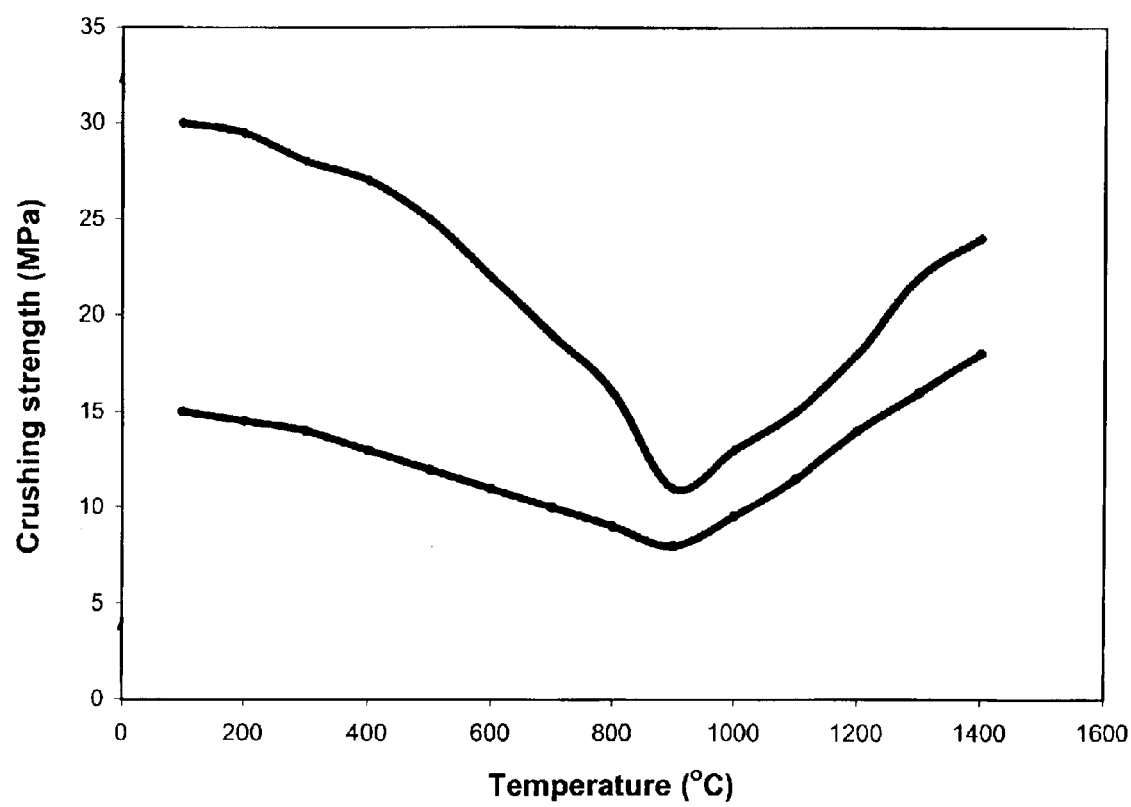
FIG. 5 represents the strength at elevated temperature of iron oxide briquettes.
Figure 6:
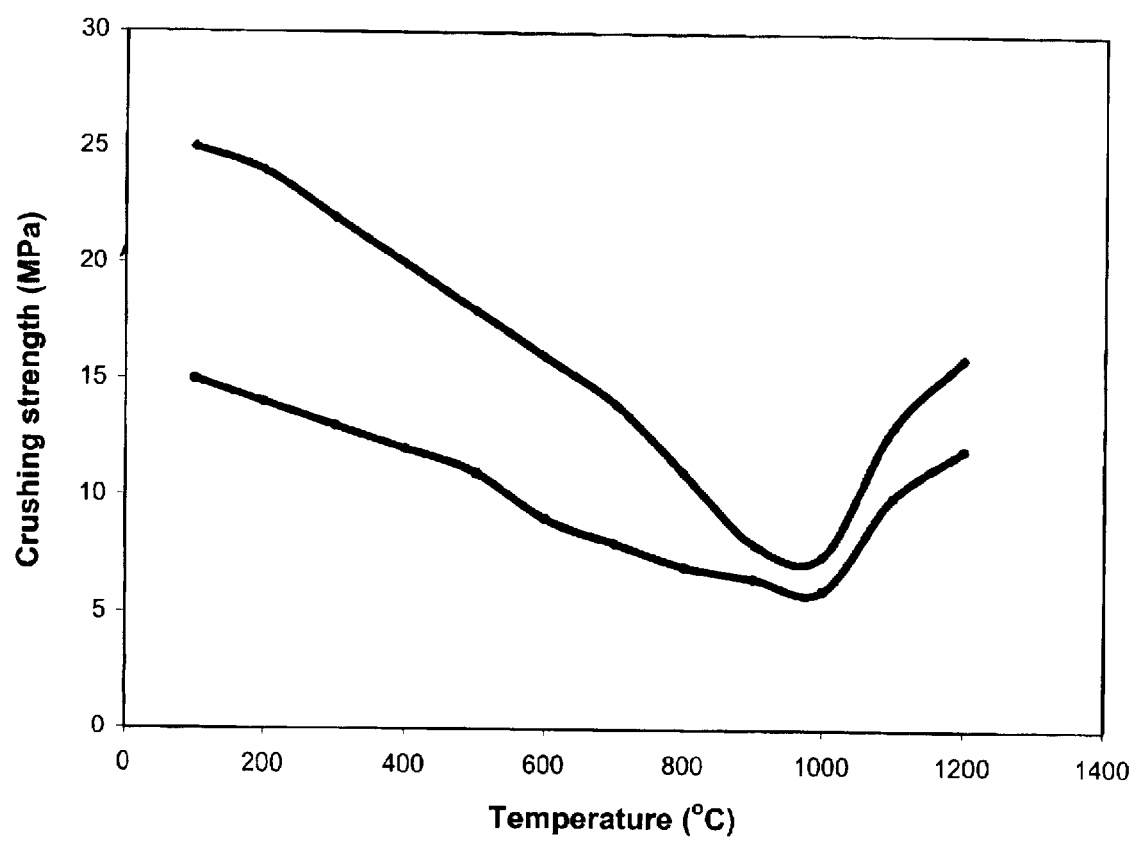
FIG. 6 represents the trend in retention of strength of iron oxide briquettes under reducing atmosphere at elevated temperature.
Figure 7:
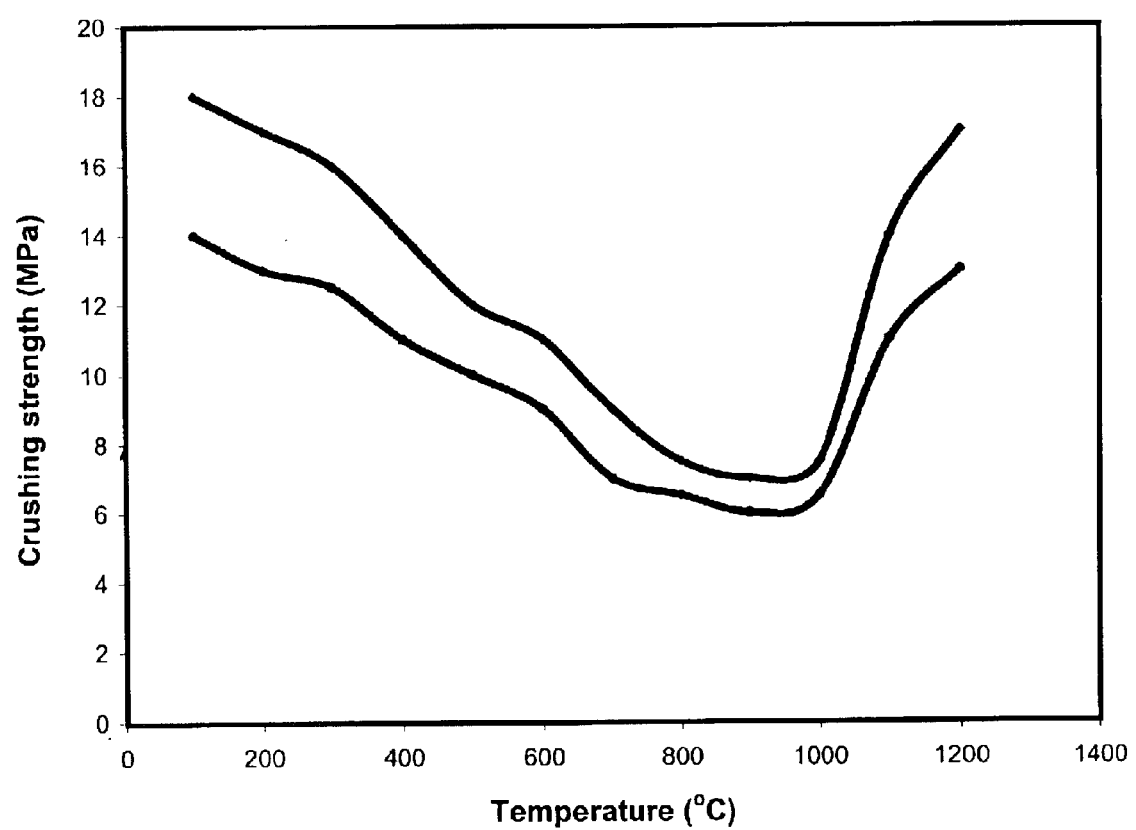
FIG. 7 represents the trend in retention of strength of iron oxide pellets under reducing atmosphere at elevated temperature.
Figure 8:
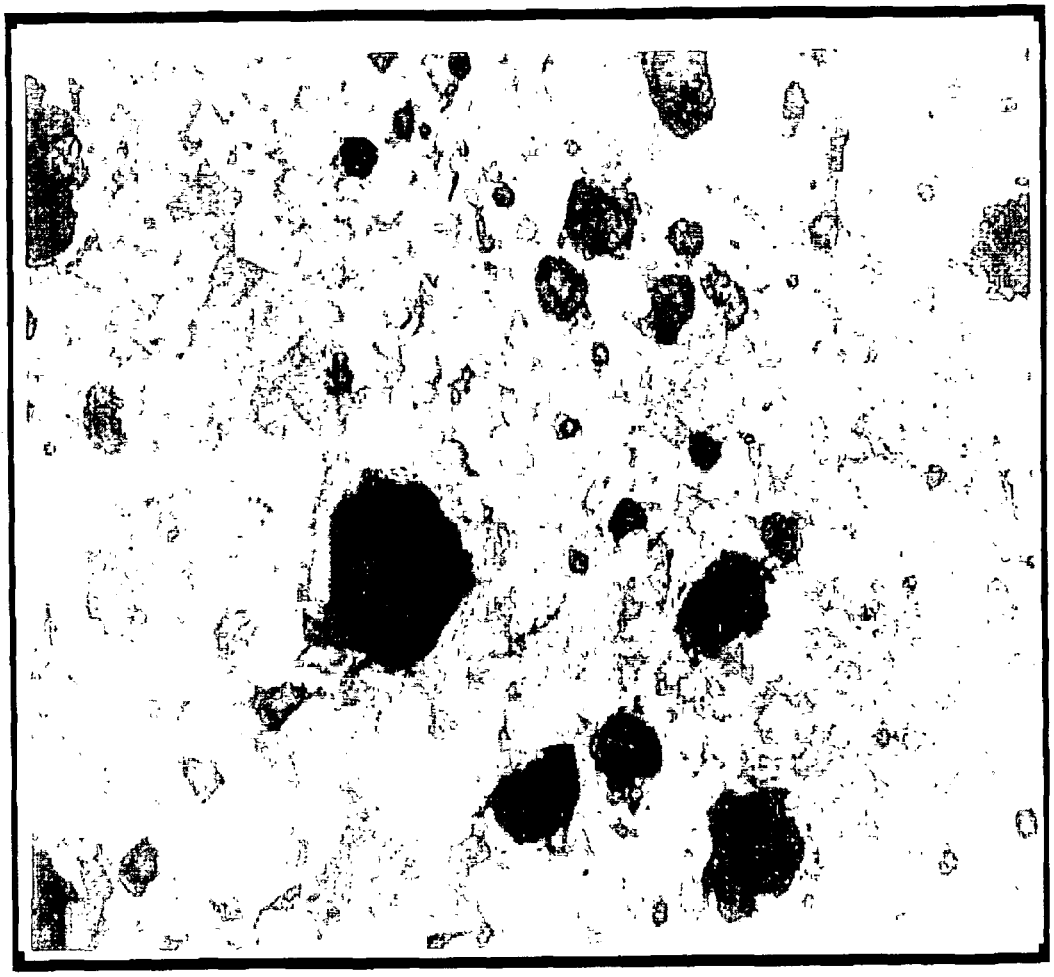
FIG. 8 represents the photomicrograph illustrating the bonding mechanism of Fe-oxide particles by the binder phase in an agglomerated product after oxidising heating at 1050° C.
Figure 9:
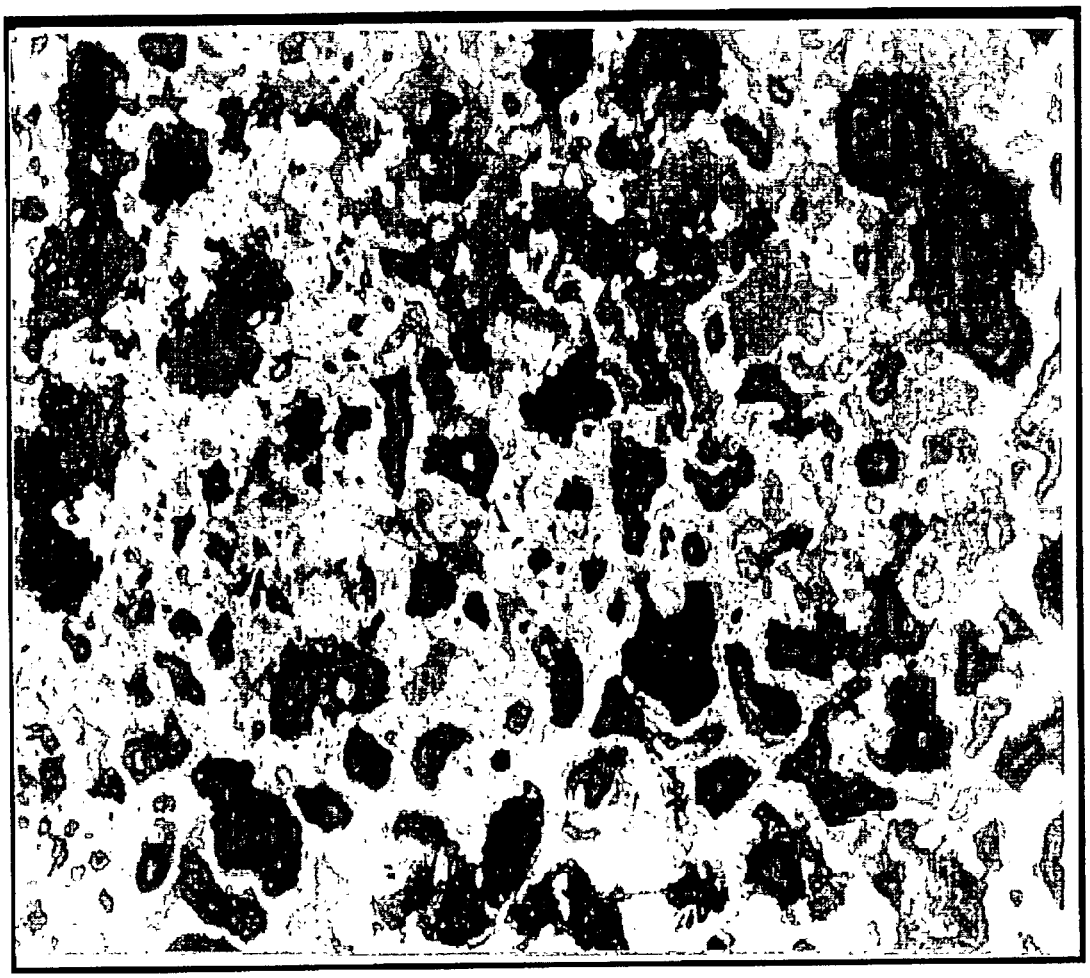
FIG. 9 represents the photomicrograph illustrating the extent of reduction of Fe-oxides to Fe-metal after treating of the agglomerated product in a confined coke chamber at 1050° C. for 1-hour duration.

$Fe_2O_3$, $CaO-Al_2O_3-Fe_2O_3$, $CaO-Fe_2O_3-MgO-SiO_2$ and $CaO-SiO_2$ which on hydration impart binding property. The binder is an ultrafine powdery material consisting of these iron bearing mineral phases. The binder itself on casting (cube) using a paste mixture of proper water content attains the strength on hydration in the order of 70 to 85 MPa. But the same paste casting under compaction pressure, the hydration strength increases 20 to 30% more than the normal strength. FIG. 3 illustrates the performance of the iron bearing hydraulic mineral binder on strength at normal casting (CCP 0) and casting under compaction pressure (CCP) of 1, 2, 3 tonne. At elevated temperature the casted cube of the binder shows a marginal loss of hydration strength within 800° C. due to the loss of structural water. The strength of binder significantly increases above 800° C. temperature due to the binding of the precipitated oxide phases. FIG. 4 illustrates the typical phenomena in loss and gain of strength in the casted cubes of iron bearing hydraulic mineral binder at elevated temperature. Similar phenomena of loss and gain of strength of the binder at elevated temperature prevails in the agglomerated products. The binder adds beneficial constituents of iron and lime value to the product suitable for metallurgical use and also retains high strength up to 600° C. and above 800° C. temperature, volume stability and thermal stability in the agglomerated product. FIG. 5 illustrates the strength at elevated temperature of iron oxide briquettes consisting of 4–10% binder. FIG. 6 illustrates the trend in retention of strength of iron oxide briquettes under reducing atmosphere at elevated temperature. FIG. 7 illustrates the trend in retention of strength of iron oxide pellets under reducing atmosphere at elevated temperature. Formation of hydrated precipitates of iron and lime bearing structures of the binder not only provide binding strength but also act as promoter in early sintering and reduction reactions of Fe-oxide particles in the agglomerated products. FIG. 8 photomicrograph illustrates the bonding mechanism of Fe-oxide particles by the binder phase in a agglomerated product after oxidising heating at 1050° C. temperature. The binder primarily forms calcium-ferrite structures on heating which imparts strength to the agglomerated particles. FIG. 9 photomicrograph illustrates the extent of reduction of Fe-oxides to Fe-metal after treating of the agglomerated product in a confined coke chamber at 1050° C. for 1 hour duration.

The retention of high strength at atmospheric condition and at elevated temperature, volume and thermal stability, resistant to moisture and humidity, promoting in faster sintering and reduction of Fe-oxide phases and free in emission of corrosive gases at elevated temperature and impurities are some special features of the present process in manufacture of cold briquettes and pellets of ferrous and non-ferrous mineral fines suitable for metallurgical and other applications.

The invention of the present process has been established by conducting series of laboratory scale experiments to produce briquette, block and pellet shaped agglomerates from different combinations of Fe-bearing oxides, metals and other mineral fines such as iron ore, blast furnace dust and sludge, basic oxygen furnace (BOF) dust and sludge, mill scale and oil and carbon contaminated sludge and fines, lime, limestone, dolomite, dunite, quartzite, coke and carbonaceous materials using the iron bearing hydraulic mineral binder. The agglomerated products have been examined to evaluate the physical, metallurgical and high temperature properties for various applications.

The following examples are given by way of illustration and therefore should not be construed to limit the scope of the present invention.

EXAMPLE-1

Iron ore (−6.3 mm size) 3.600 kg, iron rich mineral binder 0.400 kg (10% ore basis) and 0.130 litre water [water to binder (W/B) ratio 0.32] are altogether mixed in a drum mixture for 5 minutes. Green mixture of 2 kg each is then used to make cylindrical briquettes of 30 mm diameter under 0.5 tonne and 5 tonne compression load. In order to maintain identical weight of the briquettes, 55 g of green mixture is used per briquette. Accordingly, 30 number of briquettes under load 0.5 tonne having 0.70 compression ratio and 5 tonne having 0.60 compression ratio are made. Both the briquette samples are water cured after 12 hours of interval in normal atmospheric air up to 20 days for hydration of binder and development of cold strength. Cold bonding strength of the briquettes develop with time and on the rate pf hydration of binder. The binder attains almost 90% of its hydration strength in 20 days and balance strength within 90 days. The briquettes made under 0.5 tonne and 5.0 tonne compression load attain at 1, 3, 7, 14, 21 and 28 days water curing in the order of 4.8, 11.0, 14.8, 18.5, 21.0 and 23.0 MPa and 8.0, 14.2, 22.0, 27.0, 31.0 and 34.8 MPa respectively as the cold crushing strength. At elevated temperature, the briquettes having the cold strength of 23.0 MPa and 34.8 MPa possess 22.8, 21.5, 20.5, 18.8, 16.0, 22.0 and 29.0 MPa, and 34.5, 32.0, 29.5, 24.0, 17.0, 22.8 and 31.2 MPa respectively as the crushing strength after heating at 200, 400, 600, 800, 1000, 1200 and 1400° C. temperature. The iron ore briquettes show some extent in loss of strength between 800 to 1000° C. temperature without change in volume. But the briquettes attain higher strength after heating above 1000° C. temperature. Overall weight loss of the briquettes is 8 to 10% at 1000° C. temperature.

EXAMPLE-2

Iron ore (−4 mm size) 1.680 kg, coke dust (−0.5 mm) 0.160 kg, iron rich mineral binder 0.160 kg (8% on weight basis), water 70 ml and surface active agent 2 ml are mixed in a tray for 5 minutes. The green mixture is briquetted under 3 tonne compression load to produce 30 mm diameter cylindrical briquettes at compression ratio of 0.62. Using 50 g of mixture for each briquette. 20 briquettes are made from the above mixture and cured in water for 28 days. The coke containing composite iron ore briquette attains 6.4, 13.0, 18.6, 23.5, 25.8 and 27.0 MPa as the average cold crushing strength at 1, 3, 7, 14, 21 and 28 days of water curing respectively.

EXAMPLE-3

BOF dust (−1 mm size) 2.000 kg, mill scale (−3.0 mm) 0.800 kg, iron ore (−2 mm) 0.800 kg, iron rich mineral binder 0.400 kg (10% on weight basis), water 120 ml and surface active agent 5 ml are mixed altogether in a drum mixture for 5 minutes. Green mixture of 2 kg of each is used to make 30 mm diameter cylindrical briquettes under 4 tonne and 5 tonne compression load. Weight of green mixture used for each briquette is 45 g. Accordingly, 40 briquettes each under 4 tonne and 5 tonne load are made and cured in water for 28 days. The briquettes made under 4 tonne and 5 tonne compression load attain 5.5, 13.5, 18.5, 22.0, 24.4 and 26.2 MPa and 8.0, 16.3, 21.5, 25.0, 26.8 and 28.5 MPa respectively as the average cold crushing strength at 1, 3, 7, 14, 21 and 28 days of curing in water.

EXAMPLE-4

Mill scale (−4.0 mm size) 3.200 kg, Fe-bearing oily sludge 0.400 kg, iron rich mineral binder 0.400 kg (10% on weight basis), surface active agent 8 ml and water 120 ml are used to prepare mixture. Mill scale, Fe-bearing oily sludge, surface active agent are mixed altogether in a drum mixture to improve the surface property of Fe-metal particles. Then binder and water is added to it and mixed thoroughly for 5 minutes. The green mixture of 4 kg is used to make 30 mm diameter cylindrical briquettes under 3 tonne and 5 tonne compression load. 50 g of green mixture per briquette is used. 20 number of briquettes at two different compressive load (3 tonne, 5 tonne) are prepared and water cured after 12 hours of interval for 28 days. The briquettes made under 3 tonne and 5 tonne compression load attain 5.0, 12.0, 17.0, 21.0, 23.5 and 24.8 MPa and 5.6, 13.8, 18.8, 22.5, 25.0 and 26.5 MPa respectively as the cold crushing strength in 1, 3, 7, 14, 21 and 28 days of curing in water.

EXAMPLE-5

Coke breeze powder (−3.0 mm size) 3.600 kg, iron rich mineral binder 0.400 kg (10% on coke basis), water 250 ml and surface active agent 8 ml are mixed in a drum mixture for 5 minutes. Then the mixture is briquetted to make 30 mm diameter cylindrical briquettes under 2 tonne and 3 tonne compression load. 30 g of mixture is used for a briquette. The coke briquettes made under 2 tonne and 3 tonne compression load are water cured separately after 24 hours of interval for 28 days. The briquettes made under 2 tonne pressure possesses 2.0, 4.0, 7.0, 8.5, 9.6 and 10.0 MPa as the cold crushing strength in 1, 3, 7, 14, 21 and 28 days of curing respectively. Similarly the coke briquettes made under 3 tonne compression pressure attain at 1, 3, 7, 14, 21 and 28 days of water curing 2.3, 5.0, 8.0, 10.5, 11.8 and 12.5 MPa crushing strength respectively.

EXAMPLE-6

Iron ore (−10.0 mm size) 7.000 kg, mill scale (−3.00 mm) 2.00 kg, iron rich mineral binder 1.000 kg (10% on weight basis), water 350 ml and surface active agent 5 ml are altogether mixed in a drum mixture for 5 minutes. 400 g of the mixture is used to cast blocks of using the mould of (5×5×5) cm size by a cube vibrator giving 2 minutes vibration time. The blocks are removed from the mould after 24 hours of casting and then immersed in a water tank (28±2° C.) for curing up to 28 days. In every 7 days interval, the water of the tank is renewed by fresh water. Cold strength of the blocks is measured at 1, 3, 7, 14, 21 and 28 days of interval. The block attains 4.0, 8.0, 12.4, 14.0, 16.5 and 17.6 MPa as the crushing strength in 1, 3, 7, 14, 21 and 28 days of curing in water.

EXAMPLE-7

Iron ore powder (−2.0 mm size) and iron bearing mineral binder are mixed to prepare dry mixture for manufacture of cold bonded pellet. 10 kg of mixture of each containing 8% and 16% (on weight basis) binder is made by through mixing in a drum mixture. The mixture of each sample containing 8% and 16% binder is palletised by a disc granulator of 1 meter pan diameter at the set up angle of 30° in presence of water [water:binder (W/B) ratio 1.2] to make 8 to 16 mm size balls. Pelletisation time is maintained for 10 minutes in each case to achieve 2000 to 2250 kg/m³ bulk density of green pellet. The green pellets of each mix are cured in water after 24 hours of interval up to 28 days. Cold strength of the pellet (taking average of 10 pellets) is determined at 3, 7, 14, 21 and 28 days of curing. Average cold crushing strength 40, 68, 115, 150 and 173 kg/pellet of 8% binder and 62, 98, 136, 180 and 202 kg/pellet of 16% binder is obtained at 3, 7, 14, 21 and 28 days of curing in water respectively. The strength obtained in the pellet after 28 days of curing is quite stable and remains unchanged on heating at 600° C. temperatures.

EXAMPLE-8

Limestone powder (−3.00 mm size) 4.750 kg and iron bearing mineral binder 0.250 kg (5% on weight basis), water 100 ml are mixed in a drum for 3 minutes to make green mixture. 2.500 kg of green mixture of each is briquetted to produce cylindrical shape (30 mm diameter) briquettes by applying 2 tonne and 4 tonne compaction load. 50 g of green mixture is used per a briquette to maintain identical weight. The briquettes casted under 2 tonne and 4 tonne compaction load are water cured separately in 12 hours of interval. The briquettes made with 2 tonne load attain 3.0, 6.0, 9.0, 12.5 and 14.0 MPa as crushing strength at 1, 3, 7, 14 and 21 days of water curing. Same composition of briquettes prepared under 4 tonne compaction load shows at 1, 3, 7, 14 and 21 days of curing in the order of 4.0, 7.2, 10.5, 13.8 and 15.4 MPa as the crushing strength.

The examples illustrate that particle size, content of binder, range of compaction load and compaction factor in case of briquettes and blocks, granulation time in case of pellet, water and binder ratio etc. are some variable factors in making cold briquettes, pellets and microgranules. Cold strength of the agglomerated product gradually increases with time. But in consideration to time and productivity, 3 to 7 days of water curing is ideal in commercial production. Depending on the purpose, type of material and limitation of chemical composition, the minimum requirement of binder is a decisive factor on the basis of application of the agglomerated products.

The main advantages of the present invention are:
1. Applicable for cold agglomeration of non-ferrous minerals other than the metallurgical dust.
2. Energy efficient, economical, uses coarser size particles up to 10 mm for briquetting and use of particles ranging up to 2 mm size for pellet making.
3. Curing condition is very simple and in atmospheric temperature.
4. Flexible in using oil and carbon contaminated materials.
5. Better physical and metallurgical properties in terms of strength at cold and hot condition, volume stability, resistance to moisture for long term storage, sinterability and reducibility.
6. Addition of extra iron and lime as a part of metallurgical constituent in form of a binder.
7. Environmental-friendly and free in emission of gaseous impurities.

What is claimed is:
1. A process for cold briquetting and pelletization of ferrous or non-ferrous ores or mineral fines using iron bearing hydraulic mineral binders for metallurgical applications, said process comprising the steps:
   (a) mixing 84–95% by Wt. of a metallurgical or mineral or carbonaceous or oil contaminated material in the form of dust or fines or sludge with 4–10% by Wt. of an iron bearing hydraulic mineral binder and optionally with 2–6% by Wt. water and 0.05 to 0.20% by Wt. of a surface active agent to form a homogenized dry mix or slurry;
   (b) pelletizing or compacting the dry mix or slurry of step (a) to form an agglomerated mass; and
   (c) curing the agglomerated mass of step (b) for 3–20 days by exposing the agglomerated mass to atmospheric air for 10–14 hours per day followed by moisturizing the agglomerated mass.

2. A process as claimed in claim 1, wherein said metallurgical or mineral or carbonaceous or oil contaminated material in the form of dust or fines or sludge is selected from the group consisting of iron containing ores, blast furnace dust and sludge, basic oxygen furnace (BOF) dust and sludge, mill scale and oil and carbon contaminated sludge and fines, lime, limestone, dolomite, dunite, quartzite, coke, carbonaceous materials and mixtures thereof.

3. A process as claimed in claim 1, wherein the iron bearing hydraulic mineral binder contains 20 to 25% by Wt. $Fe_2O_3$, 40–60% by Wt. CaO and MgO and 12–18% by Wt. $SiO_2+Al_2O_3$.

4. A process as claimed in claim 1, wherein the surface active agent is triethanolamine.

5. A process as claimed in claim 1, wherein the agglomerated mass is in the form of cylindrical blocks or briquettes or pellets or microgranules.

6. A process as claimed in claim 1, wherein the granulometric size of the mixture is to about 10 mm for block or briquette.

7. A process as claimed in claim 1, wherein the granulometric size of the mixture is to about 2 mm for pellets or microgranules.

8. A process as claimed in claim 1, wherein water is added during the step of mixing in step (a) if the agglomerated mass is to be prepared in the form of blocks or briquettes.

9. A process as claimed in claim 1, wherein in step (b), the slurry is fed to a rolling or compaction press device to form the blocks or briquettes.

10. A process as claimed in claim 9, wherein the rolling or compacting press device applies compaction load in the range of 0.5 to 5 tonne.

11. A process as claimed in claim 1, wherein in step (b), the dry mixture is fed to a drum or disc granulator if the agglomerated mass is to be in the form pellets or microgranules.

12. A process as claimed in claim 11, wherein said water and surface active agent are added to the dry mix in the drum or disc granulator to form the pellets or microgranules.

13. A process as claimed in claim 1, wherein the dry mix should contain at least 6% by Wt. of iron bearing hydraulic mineral binder for preparing pellets or microgranules.

14. A process as claimed in claim 1, wherein the slurry should contain at least 3% by Wt. of iron bearing hydraulic mineral binder for preparing blocks or briquettes.

15. A process as claimed in claim 1, wherein the size of the pellets is in the range of 8–16 mm.

16. A process as claimed in claim 1, wherein the size of the micro-granules is in the range of 2–8 mm.

17. A process as claimed in claim 1, wherein granulation time is in the range of about 8 minutes to about 12 minutes.

18. A process as claimed in claim 1, wherein the agglomerated mass is cured by exposing the agglomerated mass for 3–20 days to atmospheric air for 12 hours per day followed by moisturizing the agglomerated mass.

19. A process as claimed in claim 1, wherein the cold strength of the blocks or briquettes thus produced attain from about 10 MPa to about 40 MPa in about 20 days.

20. A process as claimed in claim 1, wherein the cold strength of the pellets or microgranules thus produced attain from about 4 MPa to about 18 MPa in about 20 days.

* * * * *